United States Patent [19]

Cha et al.

[11] Patent Number: 4,618,448
[45] Date of Patent: Oct. 21, 1986

[54] CARBOXYLIC/SULFONIC/POLYALKYLENE OXIDE POLYMER FOR USE AS SCALE, CORROSION, AND IRON OXIDE DEPOSIT CONTROL

[75] Inventors: Charles Y. Cha, McMurray; Richard G. Varsanik; Shih-Ruey T. Chen, both of Coraopolis, all of Pa.

[73] Assignee: Calgon Corporation, Pittsburgh, Pa.

[21] Appl. No.: 772,496

[22] Filed: Sep. 4, 1985

Related U.S. Application Data

[63] Continuation-in-part of Ser. No. 669,903, Nov. 9, 1984, abandoned.

[51] Int. Cl.[4] .............................................. C02F 5/10
[52] U.S. Cl. .................................... 252/180; 252/175; 210/696; 210/698; 210/701; 526/240; 526/287
[58] Field of Search ............... 252/175, 180; 210/696, 210/698, 701; 526/240, 287

[56] References Cited

U.S. PATENT DOCUMENTS 3,928,196  12/1975  Persinski et al. ...................... 210/58

FOREIGN PATENT DOCUMENTS 57-084794  5/1982  Japan .
58-147413  9/1983  Japan .
58-149911  9/1983  Japan .

Primary Examiner—Paul Lieberman
Assistant Examiner—Hoa Van Le
Attorney, Agent, or Firm—William C. Mitchell; R. Brent Olson; Michael C. Sudol, Jr.

[57] ABSTRACT

The instant invention is directed to a process for inhibiting corrosion and the formation and deposition of scale and iron oxide in aqueous systems, comprising adding to the system at least 0.1 ppm of a water-soluble polymer having an intrinsic viscosity of 0.05 to 2.5 dl/g, prepared from:

(a) 35 to 90%, by weight, of an unsaturated carboxylic acid, or its salt;
(b) 5 to 40%, by weight of an unsaturated sulfonic acid, or its salt; and
(c) 5 to 40%, by weight, of an unsaturated, polyalkylene oxide compound, the total of (a), (b) and (c) being 100% weight of the polymer.

9 Claims, No Drawings

CARBOXYLIC/SULFONIC/POLYALKYLENE OXIDE POLYMER FOR USE AS SCALE, CORROSION, AND IRON OXIDE DEPOSIT CONTROL

BACKGROUND OF THE INVENTION

This Application is a Continuation-in-Part of U.S. Ser. No. 669,903, filed on Nov. 9, 1984, now abandoned.

U.S Pat. No. 3,928,196 discloses the use of a copolymer of 2-acrylamido-2-methylpropylsulfonic acid and acrylic acid in inhibiting scale.

Japanese Pat. Nos. 58-149911 and 58-147413 disclose carboxylic/polyalkylene oxide copolymers as pigment dispersants. Pendant alkylene oxide chains may be capped with sulfonic groups.

Japanese Pat. No. 5,784,794 discloses copolymers of acrylic acid and allyl polyethylene glycol as scale inhibitors.

Most industrial waters contain alkaline earth metal cations, such as calcium, barium, magnesium, etc. and several anions such as bicarbonate, carbonate, sulfate, oxalate, phosphate, silicate, fluoride, etc. When combinations of these anions and cations are present in concentrations which exceed the solubility of their reaction products, precipitates form until these product solubility concentrations are no longer exceeded. For example, when the concentrations of calcium ion and carbonate ion exceed the solubility of the calcium carbonate reaction products, a solid phase of calcium carbonate will form.

Solubility product concentrations are exceeded for various reasons, such as partial evaporation of the water phase, change in pH, pressure or temperature, or the introduction of additional ions which form insoluble compounds with the ions already present in the solution.

As these reaction products precipitate on surfaces of the water carrying system, they form scale or deposits. This accumulation prevents effective heat transfer, interferes with fluid flow, facilitates corrosive processes, and harbors bacteria. This scale is an expensive problem in many industrial water systems causing delays and shutdowns for cleaning and removal.

Scale-forming compounds can be prevented from precipitating by inactivating their cations with chelating or sequestering agents, so that the solubility of their reaction products is not exceeded. Since chelation is a stoichiometric reaction, this necessitates adding as much chelating or sequestering agent as cation. These amounts are not always desirable or economical.

Almost 50 years ago, it was discovered that certain inorganic polyphosphates will prevent such precipitation when added in amounts far less than the concentrations needed for sequestering or chelating. By polyphosphates, we mean phosphates having a molar ratio of metal oxide:$P_2O_5$ between 1:1 and 2:1.

When a precipitation inhibitor is present in a potentially scale-forming system at a markedly lower concentration than that required for (stoichiometric) binding of the scale-forming cation, it is said to be present in "threshold" amounts. See for example, Hatch and Rice, "Industrial Engineering Chemistry", Vol. 31, pages 51 to 53 (Jan. 1939); Reitemeier and Buehrer, "Journal of Physical Chemistry", Vol. 44, No. 5, pages 535 to 536 (May 1940); Fink and Richardson, U.S. Pat. No. 2,358,222; and Hatch, U.S. Pat. No. 2,539,305.

Generally, sequestration takes place at a eight ratio of threshold active compound to scale-forming cation components of greater than about 10:1, depending on the anion components in the water. Threshold inhibition generally takes place at a weight ratio of threshold active compound to scale-forming cation components of less than about 0.5:1.0.

Certain water soluble polymers, including groups derived from acrylamide and acrylic acid have been used to condition water containing scale-forming compounds. As for example, see U.S. Pat. Nos. 2,783,200; 3,514,476; 2,980,610; 3,285,886; 3,463,730 and 3,518,204.

DESCRIPTION OF THE INVENTION

The instant invention is directed to a process for inhibiting corrosion and the formation and deposition of scale and iron oxide in aqueous systems, comprising adding to the system at least 0.1 ppm of a water-soluble polymer having an intrinsic viscosity of 0.05 to 2.5 dl/g, prepared from:

(a) 35 to 90%, by weight, of an unsaturated carboxylic acid, or its salt; and (b) 5 to 40%, by weight, of an unsaturated sulfonic acid, or its salt; and (c) 5 to 40%, by weight, of an unsaturated polyalkylene oxide compound.

The instant invention is also directed to a water soluble polymer, having an intrinsic viscosity of 0.05 to 2.5 dl/g prepared from:

(a) 35 to 90%, by weight, of an unsaturated carboxylic compound selected from the group consisting of acrylic acid, methacrylic acid, maleic acid, itaconic acid, their salts and mixtures thereof;

(b) 5 to 40%, by weight, of an unsaturated sulfonic compound selected from the group consisting of 2-acrylamido-2-methylpropylsulfonic acid, 2-methacrylamido-2-methylpropylsulfonic acid, methallylsulfonic acid, allylsulfonic acid, vinyl sulfonic acid, styrene sulfonic acid, their salts and mixtures thereof; and (c) 5 to 40%, by weight, of an unsaturated, polyalkylene oxide compound.

The phrase "inhibiting the formation and deposition" is meant to include threshold inhibition, colloid stablization, dispersion, solubilization, or particle size reduction.

The word "scale" includes any scale forming in an aqueous solution. Examples include calcium carbonate, calcium sulphate, calcium phosphate, calcium phosphonate (including calcium hydroxyethylidene diphosphonic acid), calcium oxalate, barium sulphate, silica, alluvial deposits, metal oxide (including iron oxide), and metal hydroxide, (including magnesium hydroxide and zinc hydroxide).

The phrase "aqueous system" is meant to include any system containing water; including, but not limited to, heat rejection (cooling) systems, boilers, evaporators, desalination, gas scrubbers, sewage sludge thermal conditioning equipment, reverse osmosis, sugar evaporators, paper processing, mining circuits and the like.

Any unsaturated carboxylic acid or salt may be used to prepare the polymer. Examples include acrylic acid, methacrylic acid, α-halo acrylic acid, maleic acid, itaconic acid, vinyl acetic acid, allyl acetic acid, fumaric acid, β-carboxyethyl acrylate, their salts and mixtures thereof. The preferred carboxylic acids are acrylic acid, methacrylic acid, β-carboxyethylacrylate, maleic acid, fumaric acid itaconic acid, mono and diesters of maleic and/or fumaric and/or itaconic acid and their salts. The most preferred carboxylic acids are acrylic acid, methacrylic acid and their salts.

Any unsaturated sulfonic acid or salt may be used. Examples include 2-acrylamido-2-methylpropylsulfonic acid, 2-methacrylamido-2-methylpropylsulfonic acid, styrene sulfonic acid, vinyl sulfonic acid, sulfo alkyl acrylate or methacrylate, allyl sulfonic acid, methallyl sulfonic acid, 3-methacrylamido-2-hydroxy propyl sulfonic acid, sulfonic acid acrylate, their salts and mixtures thereof. The most preferred sulfonic compounds are 2-acrylamido-2-methylpropylsulfonic acid, 2-methacrylamido-2-methylpropylsulfonic acid and their salts.

Any unsaturated polyalkylene oxide compound may be used. Examples include allyl polyethylene glycol, methallyl polyethylene glycol, polyethylene glycol acrylate, polyethylene glycol methacrylate, methoxy allyl polyethylene oxide, alkoxyallyl polyethylene oxide and the polypropylene equivalents thereof. Also, mixtures of polyethers formed from polyethylene oxide with other polyalkylene oxides, such as propylene or butylene oxide may be used. The polyether chain may be capped with an alkyl, aralkyl, sulfonate or phosphonate group metal or ion, or uncapped.

Mixtures of the various monomers may be used. Nonionic monomers (such as acrylamide, methacrylamide and acrylonitrile) may also be present in the polymers. Terpolymers are preferred.

The polymers in the instant invention are prepared using 35 to 90%, preferably 50-70%, by weight, of an unsaturated carboxylic acid or salt; 5 to 40%, preferably 10 to 40%, by weight, an unsaturated sulfonic acid or salt; and 5 to 40%, preferably 10 to 30%, by weight, of an unsaturated polyalkylene oxide compound.

The polymers may be prepared by mixing the monomers preferably in the presence of a free radical initiator. Any free radical initiator may be used. Examples include peroxides, azo initiators and redox systems. The polymerization may also be initiated photochemically. The preferred catalysts are sodium persulfate and sodium metabisulfite.

The polymerization may be conducted by any of a variety of procedures, for example, in solution, suspension, bulk and emulsion.

The reaction temperature is not critical. The reaction will generally occur between 10° and 100° C. The reaction, depending on the temperature, generally takes from 5 minutes to 12 hours. Measuring for residual monomer will verify when the reaction is complete.

The pH of the reaction mixture is not critical. The pH is generally in the range of 3.0 to 9.0.

The percent solids in the reaction mixture is not critical. The preferred range is 1 to 50%, by weight, solids.

The polymers are usually identified by intrinsic viscosity. The intrinsic viscosity should be 0.05 to 2.5, preferable 0.05 to 0.5 dl/g, in 1.0 M sodium chloride (measured on a 75 Cannon Ubbelohde capillary viscometer).

The polymers of the instant invention are used in a minimum dosage of 0.1 ppm, preferably 0.1 to 100 ppm, most preferably 0.1 to 25 ppm.

The polymers of the instant invention were surprisingly found effective as scale inhibitors alone and in the presence of hydroxyethylidene diphosphonic acid and other scale control agents.

The polymers of the instant invention may be used in conjunction with other corrosion inhibitors such as $PO_4^{-3}$.

EXAMPLES

The following abbreviations are used in examples and are defined as indicated:
AA is acrylic acid.
AMPS is 2-acrylamido-2-methylpropylsulfonic acid.
Allyl PEG is $CH_2=CH_2-CH_2(OCH_2CH_2)$ OH, where n is 5 to 10
Methoxy Allyl PEG is $CH_2=CH-CH_2-(OCH_2CH_2)_n OCH_3$,
where n is 5 to 10.

Polymerization

Synthesis of Allyl Ether of Methoxy Polyethylene Glycol

Methoxy PEG (Carboxwax ® 350) was reacted with an excess of allyl bromide (added slowly) in the presence of sodium hydroxide. The unreacted allyl bromide and water were then distilled out at a reduced pressure. NaBr was precipitated and filtered out. The monomer solution was diluted with methanol, then neutralized with concentrated HCl. Methanol/$H_2O$ were removed by rotary evaporation at 70° C. A clear, light brown colored solution was obtained after filtration. The resultant allyl ether structure of the product was confirmed by IR and NMR. An equimolar concentration of methoxy group and alkyl group was observed.

Synthesis of Polymers

Methoxy allyl PEG and water were added in the reactor as a heel and heated to 80° C. A 38% sodium acrylate solution and an ammonium persulfate (APS) solution and a sodium metabisulfite solution were fed in over 2 hours. The final polymer solution had 30% solids. For the preparation of AA/AMPS/Methoxy Allyl PEG terpolymer, the only modification was to add NaAMPS solution into the monomer mix and feed it in.

Intrinsic viscosities were measured in 1 M NaCl in a size 75 Cannon Ubbelohde capillary viscometer. Measurements at 2.0, 1.0, and 0.5 g/dl were taken. The Huggins equation was used to determine the intrinsic viscosity.

| Examples | Composition (Wt. %) | | | Initiator | Amount of Initiator |
|---|---|---|---|---|---|
| | AA | AMPS | Methoxy Allyl PEG | | |
| 1 | 58 | 0 | 42 | APS | 2.5% |
| 2 | 60 | 0 | 40 | APS/SMBS | 2.7%/4.0% |
| 3 | 60 | 10 | 30 | APS/SMBS | 2.4%/3.6% |
| 4 | 60 | 20 | 20 | APS/SMBS | 2.0%/2.0% |

APS: Ammonium Persulfate
SMBS: Sodium Metabisulfite

Calcium Carbonate Inhibition

Calcium carbonate inhibition was determined by adding a given concentration of the polymers of the instant invention to a solution containing 200 mg/1 $Ca^{+2}$ (as $CaCl_2$), 600 mg/1 $HCO_3^{-1}$ (as $NaHCO_3$) at pH 8.0+0.1. The solution was stored in a stagnant flask for 24 hours at 60° C. (140° F.). Poor performing samples allow a precipitate of $CaCO_3$ to form. To remove these 'solids' the solution is filtered through a 2.5 micron filter. The inhibitor effectiveness under these conditions is obtained by determination of the soluble calcium content of the test solutions using the Schwarzenbach titration method (EDTA, chrome black T indicator). The soluble calcium ion concentration in the absence of inhibitor is equivalent to 0% scale inhibition. The percent inhibition for a given test is determined by:

$$\frac{Ve - Vo}{Vt - Vo} \times 100 = \% \text{ inhibition}$$

Vo = the Schwarzenbach titration volume with no inhibitor present (control)
Vt = the Schwarzenbach titration volume when no precipitation occurs
Ve = the experimental Schwarzenbach titration volume when inhibitors are present in the test solution Calcium Phosphate Inhibition Calcium phosphate inhibition was determined by adding a given concentration of the polymer of the instant invention to a solution containing 200 mg/l $Ca^{+2}$ (as $CaCl_2$) and 9 mg/l $PO_4^{-3}$ (as $Na_2HPO_4$). The solution is buffered at pH 8.5 by adding a 16:1 solution of $NaHCO_3:Na_2CO_3$. This solution was stored for 24 hours at 60° C. (140° F.). Poor performing samples allow $CaPO_4$ precipitation to occur so the stored solutions are filtered through 2.5 filter paper to remove 'solids'. The inhibitor effectiveness under these conditions is obtained by determination of the soluble phosphate content of the test solution using a photometric method (ascorbic acid as indicator). The range of the test is about 0 to 1.6 mg/l phosphate when the color is measured in a 1-inch cell at a wavelength of 880 nm. Higher levels can be determined by: (1) diluting the sample; (2) measuring the test color in a smaller tube or cell; and/or (3) making the color measurement a 625 nm. The percent inhibition for a given test is determined by:

$$\frac{(\text{mg/l } PO_4 \text{ in inhibitor treated flask}) - (\text{mg/l } PO_4 \text{ in control flask})}{(\text{mg/l } PO_4 \text{ theoretical (9 mg/l)}) - (\text{mg/l } PO_4 \text{ in control flask})} \times 100 = \% \text{ inhibition}$$

The tendency of the polymer to prevent coagulation and precipitation of iron oxide in the presence of calcium ion was tested. The results are summarized in Table II.

TABLE II

Iron Oxide Dispersion in $Ca^{+2}$
(pH 8.2, 5 mg/l iron oxide, 5 mg/l polymer).

| Example | Polymer | Max. $Ca^{+2}$ level before coagulation |
|---------|---------|----------------------------------------|
| 5 | AA/Methoxy AllylPEG 60/40 | 5 mmoles |
| 6 | AA/AMPS 60/40 | 100 mmoles |
| 7 | AA/AMPS/Methoxy AllylPEG 60/20/20 | 400 mmoles |

Preparation of Amorphous Iron Oxide

Fresh X-ray amorphous iron oxide was prepared by the addition of NaOH to $FeCl_3$ solution at an OH:Fe ratio of 4:1 and left overnight (19 hours) at 40° C. The resulting iron oxide particles was reported to be approximately 6 nm. The amorphous iron oxide thus formed is diluted with a testing solution to give desired level of iron oxide usually 5 mg/l.

Dispersion Testing 100 cc of cooling water standard (CWS) or given $Ca^{++}$ ion concentrations containing 5 mg/l iron oxide was used for testing colloids and 5 mg/l polymer (on a solid basis) was added. The pH of these solutions was 8.0-9.0. The solutions were kept in 70° C. water bath for 24 hours. Aliquot of supernatant was taken at 24 or 72 hours and % transmission at 415 nm was measured.

What is claimed is:

1. A process for inhibiting corrosion and the formation and deposition of scale and iron oxide in an aqueous system, comprising adding to said system at least 0.1 ppm of a water soluble polymer having an intrinsic viscosity of 0.05 to 2.5 dl/g, prepared from:
   (a) 35 to 90%, by weight, of an unsaturated carboxylic acid, or its salt;
   (b) 5 to 40%, by weight, of an unsaturated sulfonic acid, or its salt; and
   (c) 5 to 40%, by weight, of an unsaturated, polyalkylene oxide compound, the total of (a), (b), and (c) being 100% by weight of the polymer.

2. The process of claim 1, wherein said polymer is prepared from:
   (a) 50 to 70%, by weight, of an unsaturated carboxylic acid or its salt;
   (b) 10 to 40%, by weight, of an unsaturated sulfonic acid, or its salt; and
   (c) 10 to 30%, by weight, of an unsaturated, polyalkylene oxide compound.

3. The process of claim 1, wherein said polymer has an intrinsic viscosity of 0.05 to 0.5 dl/g.

4. The process of claim 1, wherein 0.1 to 100 ppm of polymer is added.

5. The process of claim 1, wherein:

TABLE I

| Examples | Composition (Wt. %) | | | Initiator | Amount of Initiator | [n] (dl/g) | CaCO_3* | | | CaPO_4** | | |
|----------|-----|------|----------------|-----------|-----|------|-----|-----|-----|-----|-----|-----|
| | AA | AMPS | Methoxy Allyl PEG | | | | 1 ppm | 2 ppm | 4 ppm | 8 ppm | 10 ppm | 12 ppm |
| 1 | 58 | 0 | 42 | APS | 2.5% | 0.85 | — | — | — | 3 | 9 | 23 |
| 2 | 60 | 0 | 40 | APS/SMBS | 2.7%/4.0% | 0.2 | 95 | 100 | 100 | — | — | 35 |
| 3 | 60 | 10 | 30 | APS/SMBS | 2.4%/3.6% | 0.1 | 77 | 88 | 100 | 19 | 89 | 96 |
| 4 | 60 | 20 | 20 | APS/SMBS | 2.0%/2.0% | 0.09 | 50 | 90 | 100 | 94 | 100 | — |

*$CaCO_3$ Test: 200 mg/l $Ca^{++}$, pH = 8.0, 60° C., 24 Hours.
**$Ca/PO_4$ Test: 200 mg/l $Ca^{++}$, 9 mg/l $PO_4^{-3}$, pH = 8.5, 60° C., 24 Hours.
APS: Ammonium Persulfate
SMBS: Sodium Metabisulfite (a) said carboxylic compound is selected from the group consisting of acrylic acid, methacrylic acid, α-halo acrylic acid, itaconic acid, vinyl acetic acid, allyl acetic acid, β-carboxyethyl acrylate, fumaric acid, and maleic acid, or their salts;

(b) said sulfonic compound is selected from the group consisting of 2-acrylamido-2-methyl propyl sulfonic acid, allyl sulfonic acid, styrene sulfonic acid and vinyl sulfonic acid, or their salts; and (c) said unsaturated, polyalkylene oxide compound is selected from the group consisting of allyl polyalkylene glycol, methallyl polyethylene glycol, polyethylene glycol acrylate, polyethylene glycol methacrylate, methoxy allyl polyethylene oxide, alkoxy allyl polyethylene oxide, polypropylene equivalents thereof and mixtures of polyethers formed from polyethylene oxide with other polyalkylene oxides.

6. The process of claim 5, wherein said carboxylic compound is selected from the group consisting of acrylic acid, methacrylic acid and their salts, said sulfonic compound is selected from the group consisting of 2-acrylamido-2-methyl propyl sulfonic acid, 2-methacrylamido-2-methylpropylsulfonic acid and their salts, and said unsaturated polyethylene oxide compound is selected from the group consisting of allyl polyethylene glycol and methallyl polyethylene glycol.

7. A water soluble polymer, having an intrinsic viscosity of 0.05 to 2.5 dl/g, prepared from:

(a) 35 to 90%, by weight, of an unsaturated carboxylic compound selected from the group consisting of acrylic acid, methacrylic acid, their salts and mixtures thereof;

(b) 5 to 40%, by weight, of an unsaturated sulfonic compound selected from the group consisting of 2-acrylamido-2-methylpropylsulfonic acid, 2-methacrylamido-2-methylpropylsulfonic acid, their salts and mixtures thereof; and (c) 5 to 40%, by weight, of an unsaturated polyalkylene oxide compound, the total of (a), (b) and (c) being 100% by weight of the polymer.

8. The water soluble polymer of claim 7, wherein said polymer is prepared from:

(a) 50 to 70%, by weight, acrylic acid, or its salt;

(b) 10 to 40%, by weight, 2-acrylamido-2-methyl propyl sulfonic acid, and (c) 10 to 30%, by weight, allyl methoxy polyethylene glycol.

9. The water soluble polymer of claim 7, wherein said polymer has an intrinsic viscosity of 0.05 to 0.5 dl/g.

* * * * *